Figure 1:
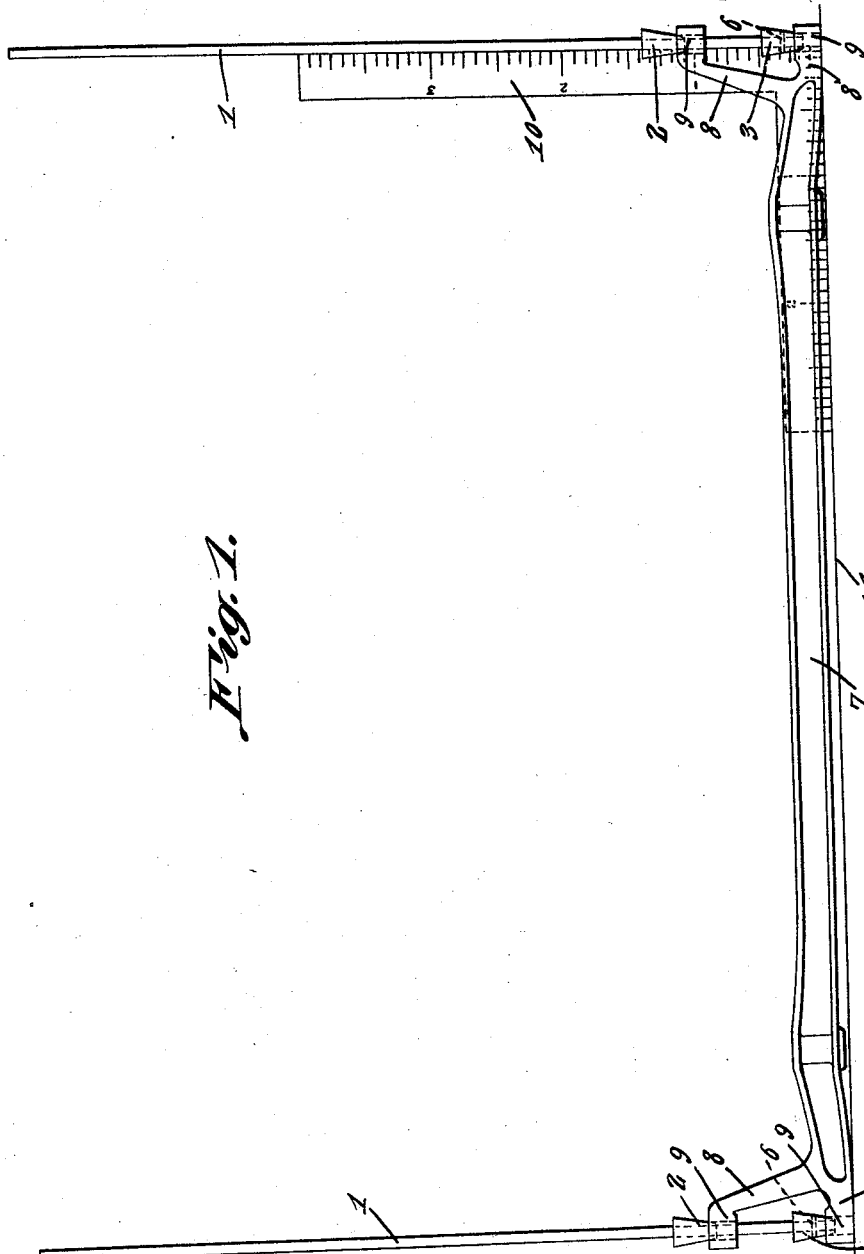

F. W. NUERWELL.
AXLE GAUGE.
APPLICATION FILED AUG. 27, 1921.

1,408,024.

Patented Feb. 28, 1922.
2 SHEETS—SHEET 1.

F. W. Nuerwell, Inventor

By C. A. Snow & Co.
Attorney

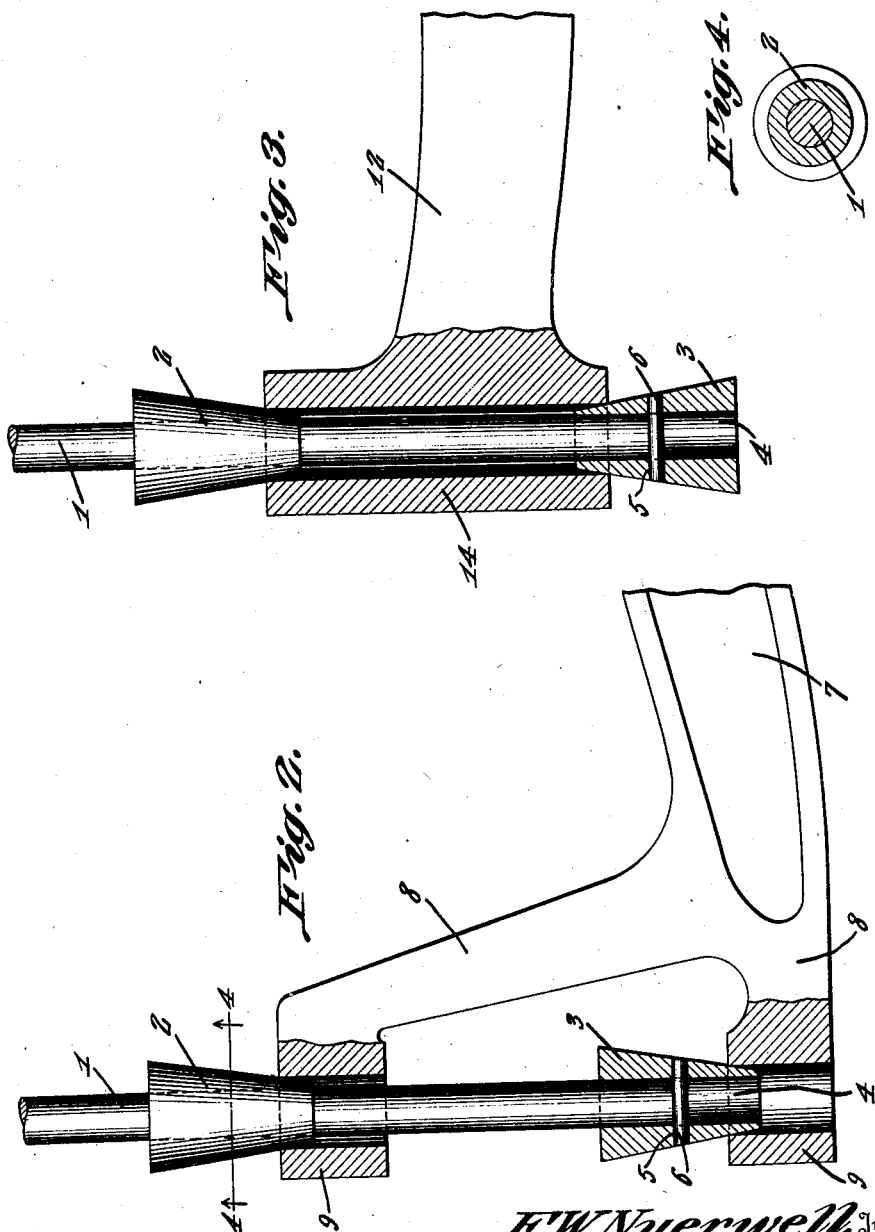

UNITED STATES PATENT OFFICE.

FRED W. NUERWELL, OF TULSA, OKLAHOMA.

AXLE GAUGE.

1,408,024.  Specification of Letters Patent.  Patented Feb. 28, 1922.

Application filed August 27, 1921. Serial No. 496,039.

*To all whom it may concern:*

Be it known that I, FRED W. NUERWELL, a citizen of the United States, residing at Tulsa, in the county of Tulsa and State of Oklahoma, have invented a new and useful Axle Gauge, of which the following is a specification.

This invention aims to provide novel means whereby a twist in the axle of a vehicle may be detected, and whereby the operator will be enabled to take out the twist and to line up the spindle bearings.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, an axle whereunto the device forming the subject matter of this application has been applied; Figure 2 is a fragmental side elevation on an enlarged scale, showing a portion of an axle carrying the device forming the subject matter of this application, parts appearing in section; Figure 3 is a view similar to Figure 2 but showing the device used in connection with a different form of axle; and Figure 4 is a cross section on the line 4—4 of Figure 2.

In carrying out the invention, there is provided a pair of rods 1. A pair of collars 2 and 3 is provided for each of the rods 1, the collars preferably being of conical form. The collars 2 and 3 have longitudinal passages 4. The collar 3 has a transverse bore 5 adapted to receive a cross pin or stop 6.

The numeral 7 marks the axle of a vehicle, the axle having arms 8 provided with spindle bearings 9.

The collar 2 is inserted into the uppermost bearing 9, the smaller end of the collar 2 being downwardly disposed. The collar 3 is inserted into the lowermost bearing 9, the smaller end of the collar being downwardly disposed. The rod 1 is inserted through the passage 4 of the collar 2, into the passage 4 of the collar 3, and into abutment with the cross pin or stop 6. When the rods 1 are thus arranged, as shown in Figure 1, it will be obvious that the rods constitute sight poles and by observing the relative positions of the rods 1, looking longitudinally of the axle, it can be ascertained at a glance, whether or not there is a twist in the axle 7, and whether or not the bearings 9 at one end of the axle are alined with the bearings 9 at the other end of the axle. If desired, the axle may be set up on a plane surface 11, as shown in Figure 1, and a square 10 may be placed on the surface 11, a comparison being made between the fiducial edge of the upright arm of the square and each rod 1.

Sometimes, as shown in Figure 3, the axle 12 has a single tubular spindle bearing 14. Then, the collar 2 is mounted as hereinbefore described, the collar 3 being inverted, so that its smaller end can be inserted into the lower end of the bearing 14, the rod being placed in the collars 2 and 3, as shown in Figure 3, and the sighting operation, involving the use of the square 10 being carried out as hereinbefore set forth.

I claim:

In a device for determining twist in vehicle axles, a rod; and spaced collars mounted on the rod, the collars being of conical form, each collar having a longitudinal passage for the reception of the rod, and one collar having a transverse bore intersecting the passage of the said collar intermediate the ends thereof; and a pin in the bore, the pin constituting a stop for one end of the rod.

In testimony that I claim the foregoing as my own, I have hereto affixed my signature in the presence of two witnesses.

FRED W. NUERWELL.

Witnesses:
JOHN A. HAUGH,
THOS R. BROWN.